Aug. 4, 1959     H. YUDENFREUND     2,898,146
FOLDABLE INSERT AND LINER FOR THE REAR OF STATION WAGONS
Filed March 26, 1958
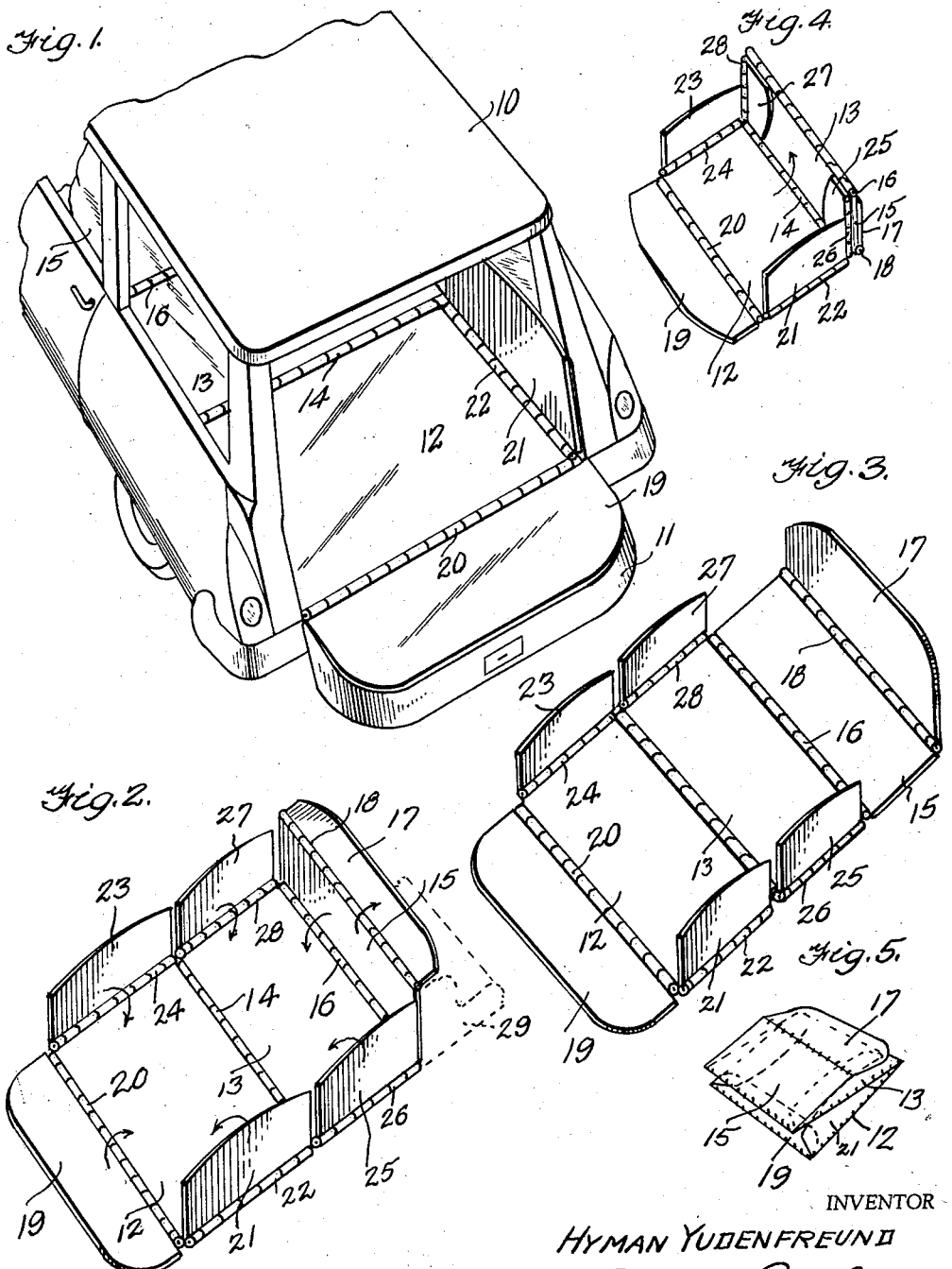
INVENTOR
HYMAN YUDENFREUND
BY
HIS ATTORNEY

United States Patent Office 2,898,146
Patented Aug. 4, 1959

2,898,146

FOLDABLE INSERT AND LINER FOR THE REAR OF STATION WAGONS

Hyman Yudenfreund, Middletown, N.Y.

Application March 26, 1958, Serial No. 724,031

1 Claim. (Cl. 296—39)

This invention relates to a foldable insert and liner for the rear of station wagons, and the like, and has for one of its objects the production of a simple and efficient means for providing a moisture and odor-proof liner for use in the rear portion of a station wagon so as to protect the interior thereof from injury or disfigurement.

A further object of this invention is the production of a simple and efficient liner for station wagons and the like, which liner is easily removable, may be easily cleaned to render it reusable, and may be folded to accommodate a minimum amount of space for storage purposes.

Other objects and advantages of the present invention will appear throughout the following specification and claim.

In the drawing:

Figure 1 is a fragmentary perspective view of the rear of a station wagon, showing the liner in place;

Figure 2 is a perspective view of the liner showing the same in an open operative position with one panel overhanging one of the seats to protect the back thereof;

Figure 3 is a perspective view of the liner in a further extended position;

Figure 4 is a perspective view of the liner partly folded to accommodate itself to the rear portion of a station wagon carrying the rear seat thereof; and Figure 5 is a diagrammatic perspective view showing the liner in a partly folded position.

By referring to the drawing in detail, it will be noted that 10 designates a conventional station wagon having a conventional tailgate 11. The improved insert and liner comprises a body formed of a primary floor panel 12, an intermediate panel 13 transversely hingedly connected to the primary panel 12, as at 14. An inner floor panel 15 is transversely hinged to the panel 13, as at 16. A seat protector end panel 17 is transversely hinged to the inner floor panel 15, as at 18, and a tailgate panel 19 is transversely hinged to the rear edge of the primary panel 12, as at 20.

A side panel 21 is longitudinally hinged to one side edge of the primary floor panel 12, as at 22, and a second side panel 23 is longitudinally hinged to the opposite side edge of the primary floor panel 12, as at 24. A side panel 25 is longitudinally hinged to the side edge of the inner floor panel 13, as at 26, and a side panel 27 is longitudinally hinged to the opposite side edge of the intermediate floor panel 13, as at 28. All of the parts may be shaped and of a size to conform to the particular station wagon with which it is intended to be used. The liner may be made of metal or other material, which will constitute a moisture and odor-proof covering, insert, or liner, for use in the rear of a station wagon.

In using the structure illustrated, the insert or liner is placed in the rear portion of the station wagon 10 upon the cargo deck in a manner shown in Figure 1, with the tailgate panel 19 overlying the tailgate 11. The primary panel 12, and the intermediate panel 13, and the inner panel 15, rest flat upon the cargo deck when the conventional intermediate station wagon seat is displaced in a conventional manner. The seat protector panel 17 is swung to a position to extend vertically, as shown in Figure 3, to protect the rear portion of the front seat. When the intermediate seat 29, shown in Figure 2 in dotted lines, is in place the inner panel 13 is swung to a vertical position to protect the rear face of the back of the seat 29, and the seat panel 17 is swung to overhang the back of the seat 29. The side panels 21, 23, 25 and 26 extend vertically, as shown in Figure 2, to shield and protect the interior sides of the station wagon.

When it is desired to use the insert or liner to protect only the rear portion of the cargo deck, and when the rear seat of the station wagon is displaced, the panels 25, 27, 15 and 17 are folded, as shown in Figure 4. The tailgate 11 may extend longitudinally, as shown in Figure 1, to provide adequate cargo deck space and the panel 19 will protect the inner face of the tailgate 11. The tailgate 11 may be swung to a closed position to carry the panel 19 to a vertical position since the hinge 20 will freely permit this action.

For the purpose of storage when not in use, the liner may be folded as shown in Figure 5, merely by folding the panel 19 inwardly to overlie the panel 12, and by folding the side panels 21 and 23 inwardly to overlie the panels 12 and 19. The panels 25 and 27 are then folded to overlie the panels 12, 19, 21 and 23. The panels 15 and 17 are then folded in a reverse position to overlie the panels 13, 25 and 27. The folding may be modified as to the detail steps and sequence thereof within the scope of the invention.

The purpose of the present insert and liner is to enable persons to use station wagons for both business and pleasure by placing the insert and liner within the vehicle or removing the same as occasion may require. The panels are preferably formed of metal or other rigid material and are constructed so that the liner may be easily removable and may be easily cleaned and is consequently reusable. The collapsible nature of the liner enables it to be used for protection of all parts of the rear portion of a station wagon. The liner may be easily inserted and removed and will take very little space for storage purposes.

Having described the invention, what is claimed as new is:

A device of the class described comprising a plurality of panels having transverse hinge connections and adapted to fit into the rear end of a station wagon upon the cargo deck thereof, a plurality of side panels having longitudinal hinge connections along the side edges of certain of said first mentioned panels, for shielding and protecting the interior of a station wagon, said first mentioned panels including a primary panel having a tailgate panel transversely hinged to the primary panel, an intermediate panel transversely hinged to said primary panel, an inner panel transversely hinged to said intermediate panel, an end panel transversely hinged to said inner panel, and said side panels being hinged longitudinally to the opposite side edges of said primary panel and to the side edges of said intermediate panel.

References Cited in the file of this patent
UNITED STATES PATENTS 818,257    Kennedy _____ Apr. 17, 1906